James F. Parker
George M. Mills
INVENTORS

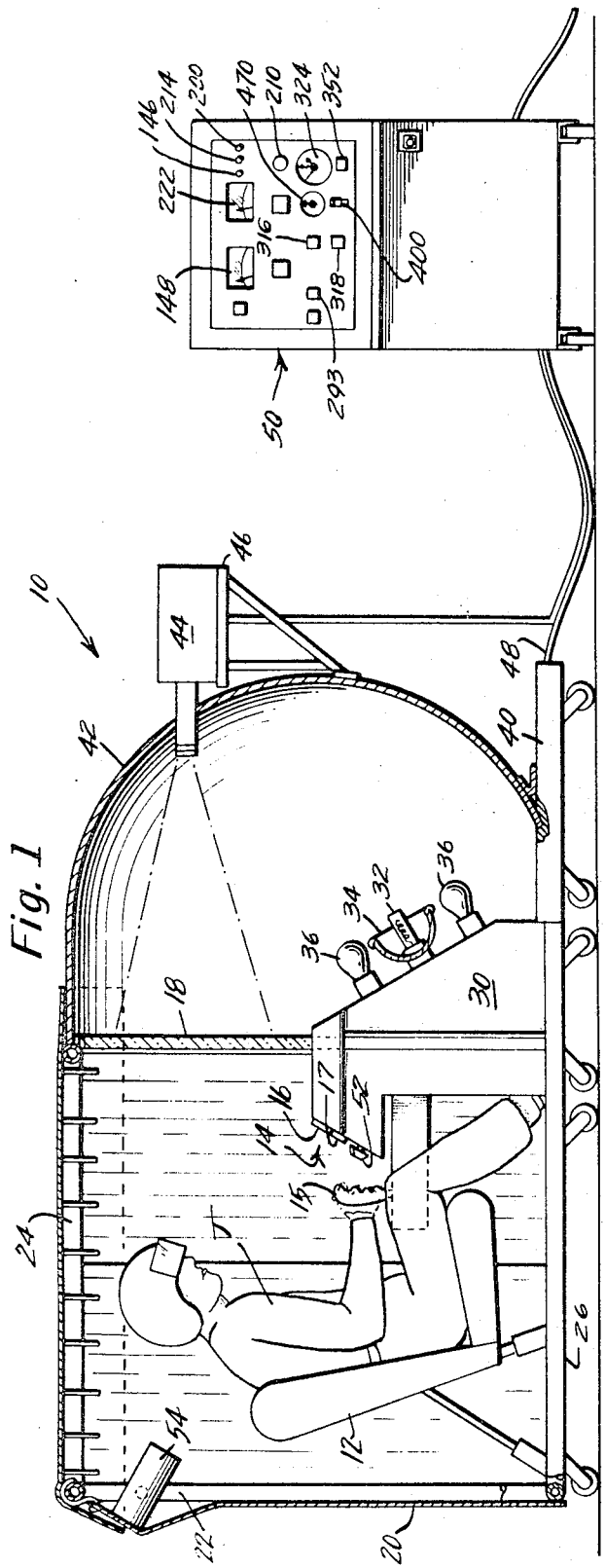

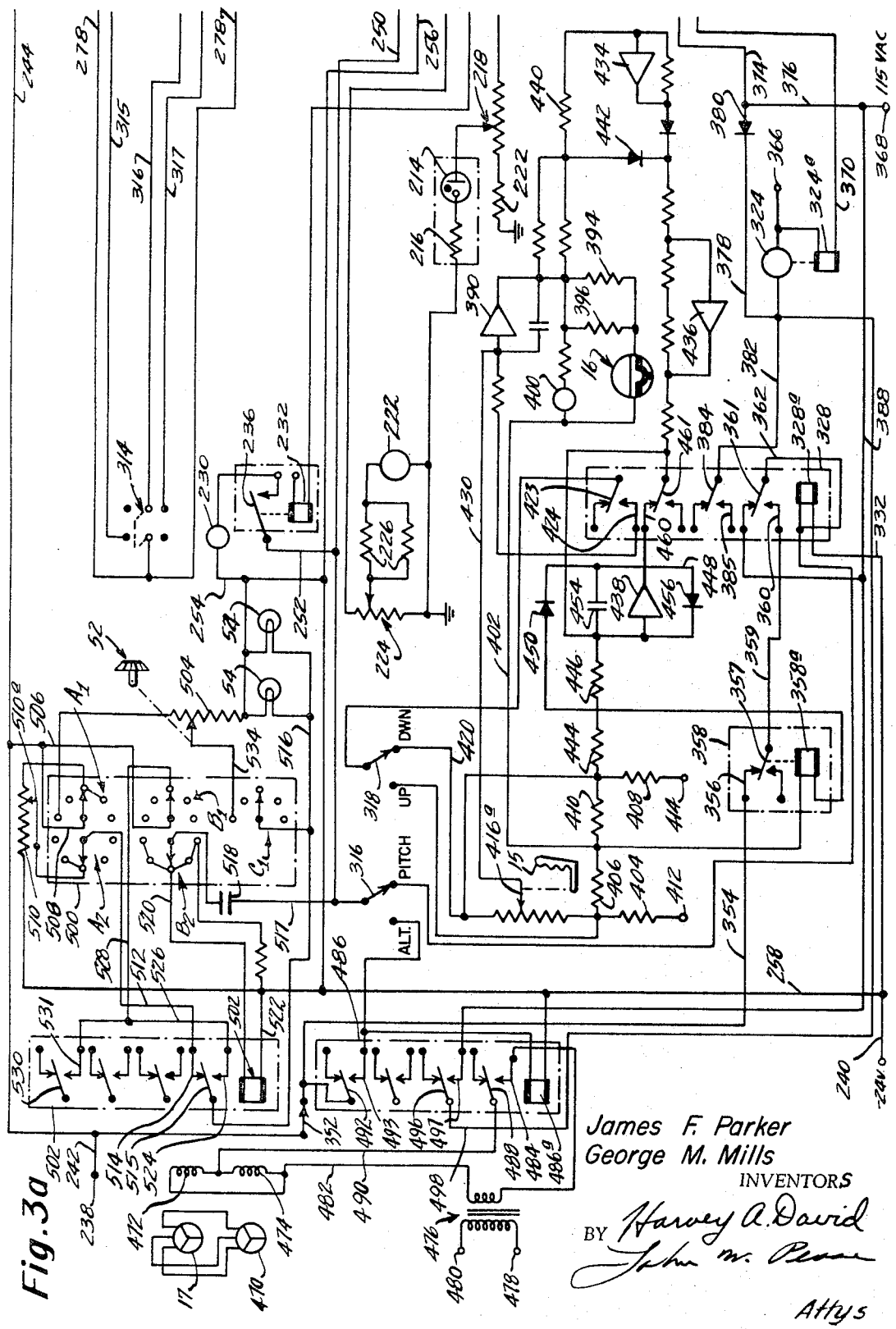

United States Patent Office 3,452,451
Patented July 1, 1969

1

3,452,451
FLASH BLINDNESS INDOCTRINATION TRAINER
James F. Parker, Jr., Oxon Hill, Md., and George M. Mills, Springfield, Va., assignors, by mesne assignments, to the United States of America as represented by the Secretary of the Navy
Filed Mar. 14, 1967, Ser. No. 623,526
Int. Cl. G09b 9/08; F21v 33/00
U.S. Cl. 35—12                              10 Claims

ABSTRACT OF THE DISCLOSURE

A flash blindness indoctrination trainer for training pilots in the use of equipment and special procedures in the event of nuclear explosion, the trainer comprising a simulated cockpit with a rear projection visual display screen, flash tube means for illuminating the screen with sufficient brilliance to induce flash blindness, floodlamp means for simulating nuclear fireball effect, simulated altimeter and artificial horizon means, clock means for timing trainee tasks therewith, and circuitry for actuating the foregoing in a correlated manner whereby they cooperate to provide the desired training function.

BACKGROUND OF THE INVENTION

Everyone understands the awesome destructive power of a nuclear burst. Fewer persons appreciate the incredible amount of light energy which is released by such a weapon. The light from a nuclear burst is considerably brighter than the sun as seen from the earth. Protection of a pilot's vision is required at much greater distances from a burst than protection from thermal radiation effects. The effects of a nuclear burst on vision may be experienced as far as several hundred miles from a burst. At a close range, the intense light may cause permanent damage to the eye (retinal burn). At a greater distance, temporary loss of vision (flash blindness) may occur, during which time the pilot would not be capable of controlling his aircraft.

Many Navy missions are flown at low altitude and high speed. It has been estimated that during these missions, the pilot spends nearly 90 percent of his time viewing the outside environment in order to maintain geographic orientation. Pilots have estimated that if their vision were lost for a brief a period as 5 or 10 seconds on such missions, they would in all likelihood either crash or become hopelessly disoriented. A pilot flying in a nuclear environment could very well be totally, but temporarily, blinded for as long a period as 50 seconds even though he were far enough from the burst to escape heat, shock, and radiation effects, and even though he were flying directly away from the burst.

It is virtually impossible for a trainee to appreciate the problem of flash blindness until he has been exposed to light of intensity comparable to that released by a nuclear weapon. A trainee who has experienced the startle, intense afterimages, and loss of vision associated with flash blindness both understands and appreciates the inherent hazards. The first training need, then, is for simulation of and indoctrination in the features of flash blindness without the risk of permanent damage to the visual system. The second training need is to provide a method for demonstrating the decrease in performance which occurs as a result of flash blindness.

The third training need is for a means to demonstrate the effectiveness and proper operation of devices and procedures designed to afford protection against flash blindness. The Navy has gone to great trouble and expense to develop protective devices and procedures for protection from flash blindness. Flash blindness protective devices,

2 as they are delivered into the fleet, represent a class of equipment entirely new to pilots. These devices attempt to meet a requirement for which no previous equipment has been provided. Since these devices are so new and since many of them operate in a strange manner, their introduction into the fleet must be accompanied by a training program designed to illustrate their method of operation and to show how to use them properly. In addition, by actually experiencing flash blindness, a pilot will better appreciate the need for protective devices and should be more highly motivated to use them correctly.

SUMMARY OF THE INVENTION

With the foregoing in mind, it is a principal object of the invention to provide a novel flash blindness indoctrination trainer device which will simulate the flash from a nuclear weapon viewed at a distance which would cause temporary visual incapacitation but would cause no damage to the eye so as to demonstrate the decrement to performance caused by such a flash and provide practice using protective devices and procedures to reduce the visual incapacitation.

Another object of the invention is to provide a device of the foregoing character comprising means such as a simulated altimeter and/or artificial horizon, together with timing means and a control stick, for providing visual discrimination and tracking tasks which emphasize the effect of flash blindness on performance by comparing the time a pilot requires to perform a task when flash blinded with the time required to perform the task when proper use is made of protective devices and procedures.

As another object the invention aims to accomplish the foregoing through the provision of a flash blindness indoctrination trainer comprising a translucent, light diffusing screen; means defining a trainee station to one side of said screen; flashtube and reflector means disposed on the other side of said screen for directing a flash of high intensity light therethrough; floodlamp means disposed on said other side of said screen for directing progressively decaying light through said screen; power supply and control circuitry for energizing said flashtube and said floodlamp means so as to simulate a nuclear flash and subsequent fire-ball effect sufficient to induce flash blindness in the eyes of a trainee at said viewers station; instrument simulation means including movable indicator means; trainee operated control means for said instrument simulation means; and clock means for timing a task performed by said trainee with said control means.

BRIEF DESCRIPTION OF THE DRAWINGS

The invention may further be said to reside in certain combinations and arrangements of parts by which the foregoing objects and advantages, as well as others, are obtained as will be understood from the following detailed description when read in conjunction with the accompanying sheets of drawings forming part of this specification, and in which:

FIG. 1 is a sectional view of a flash blindness indoctrination trainer embodying the present invention;

FIG. 2 is a fragmentary perspective view of a portion of the trainer;

FIGS. 3a and 3b constitute a schematic diagram of power supply and control circuitry of the trainer of FIG. 1.

DESCRIPTION OF THE PREFERRED EMBODIMENT

Figure 3B:
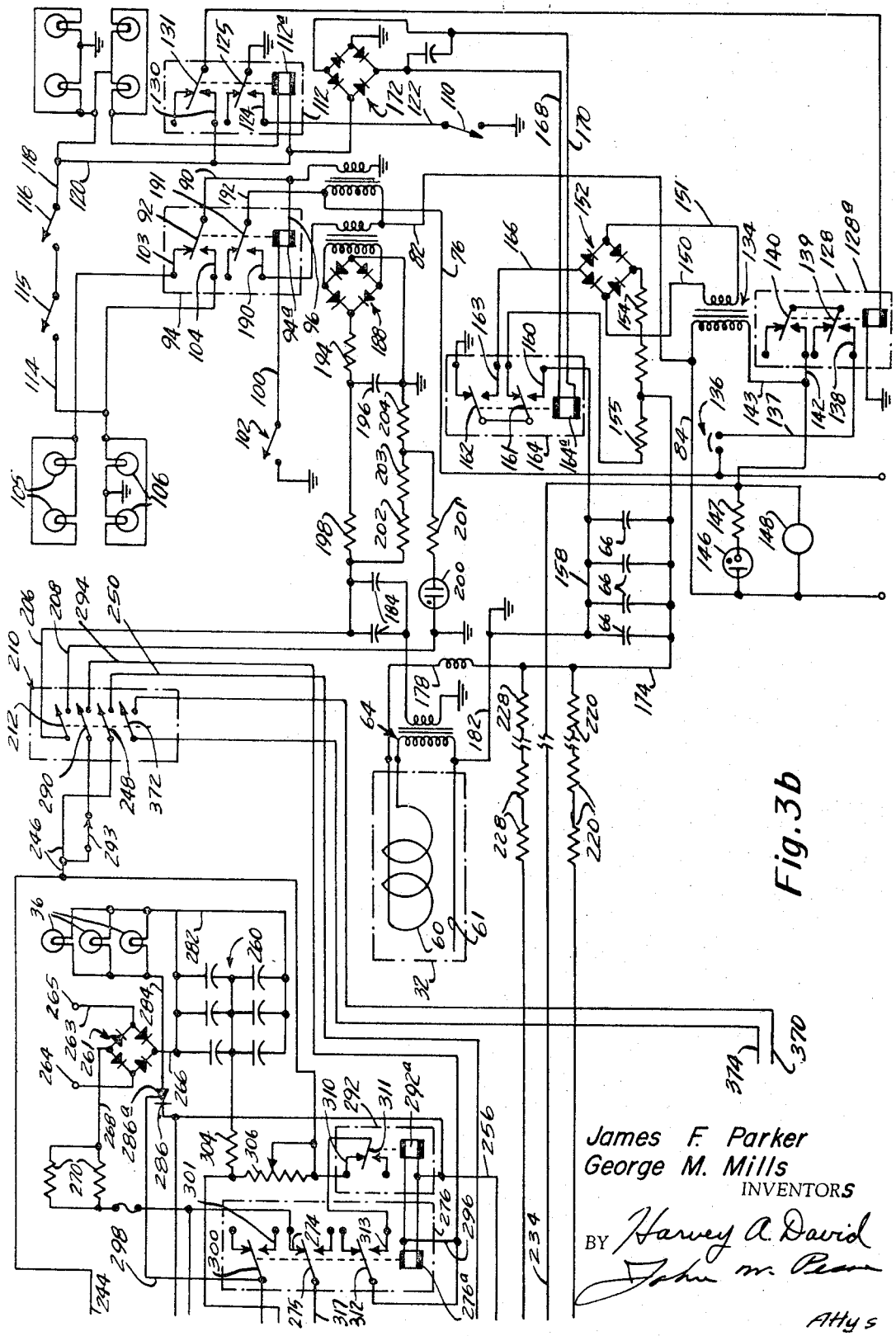

In the form of the invention illustrated in the drawings and described hereinafter there is provided a flash blindness indoctrination trainer 10 which includes a viewing station for a trainee T, the station being defined by a seat 12, instrument panel 14 and control stick 15 which simulate the general arrangement of an aircraft pilot's cockpit. The instrument panel 14 is provided with a simulated artificial horizon device 16 and a simulated altimeter 17 for use by the trainee in performing timed visual perception tasks as will later be described.

A light diffusing, transluscent rear projection screen 18 is disposed generally above and to the sides of the instrument panel 14. The screen 18 is adapted to be illuminatet, by means presently to be described, with such brilliance that light transmitted to the eyes of the trainee T will cause him to experience flash blindness for a period of 5 to 50 seconds. During this period of blindness the mentioned visual perception tasks may be performed.

The trainee's station is preferably enclosed by light excluding means such as a curtain assembly 20 supported by a suitable framework including uprights 22 and horizontal members 24 which, together with the seat 12 are conveniently mounted on a castored base frame 26.

The instrument panel 14 and a support 28 for the control stick 15 are mounted on portions of a castored console 30 extending into the trainee's station on one side of the screen 18. The remainder of the console 30 extends on the other side of the screen 18 and serves as a mount for a gas-filled flashtube 32, a reflector 34 therefor, and a plurality of floodlamps 36, the operation of which will become apparent as the description proceeds.

A generally horizontally extending power supply housing 40 is also disposed on the side of screen 18 away from the trainee's station and supports a generally hemispherical reflector 42. The reflectors 34 and 42 cooperate to focus light from the flashtube 32 toward the eyes of a trainee T when the flashtube is fired to illuminate the screen 18 in simulation of a nuclear explosion.

A motion picture projector 44 is supported on a platform 46 mounted on the rear, external surface of the reflector 42 and is adapted to project a motion picture through an opening in the reflector 42 and onto the screen 18 for viewing by the trainee T. The motion picture preferably shows the ground as would be seen by a pilot through the cockpit windshield during a low level, high speed mission. The purposes of the motion picture are to add realism to the training situation and also to focus the trainee's attention on the portion of the screen 18 over the instrument panel 14 and simulating the cockpit windshield so that when the nuclear blast simulating flash occurs it will have the desired effect on his vision.

The console 30 is suitably electrically connected to the power supply cabinet 40 by conductor cable means not shown, and the cabinet 40 is connected by suitable conductor cable means 48 to an instructors console 50 from which the operation of the trainer 10 is controlled, with the exception of the trainee's control stick 15 and a storm light control knob 52 for use in controlling storm lights 54 to aid in overcoming flash blindness as will be explained more fully hereinafter.

Referring now to FIGS. 3a and 3b, the power supply and control circuitry for the trainer 10 will be described. The flashtube 32 is of the gas filled type having electrodes 60, 61 between which a high voltage discharge can occur if the gas is sufficiently ionized as by a higher voltage trigger discharge between the electrodes. Briefly, the circuitry controlling operation of the flashtube 32 includes three major sections, the flashtube trigger circuit which includes a trigger transformer 64 and serves to ionize the gas to provide a discharge path for high voltage, a bank of parallel connected storage capacitors 66 which provides the flash producing high voltage to the flashtube, and a resistor network which bleeds voltage from the bank of capacitors 66 to operate related indicator lights and meters as will be later explained.

The charging of the bank of capacitors 66 is accomplished by circuitry including a plurality of switches and relays. At this point it should be noted that all relays are illustrated in their de-energized positions, and switches in their normally open or closed positions.

An energizing circuit for a relay actuating, step-down transformer 70 can be traced from a 115 volt A.C. input terminal 74 through a conductor 76, the primary winding of transformer 70, and conductors 82 and 84 to a 115 volt A.C. common input 86. The secondary winding of transformer 70 is connected at one side to ground (which may be the supporting chasis) and on the other side through a conductor 90 to a movable contact 92 of relay 94, and by a conductor 96 to the solenoid 98 of that relay. The solenoid 98 is connected by conductor 100 and a switch 102 to ground so that closing of the switch 102 actuates relay 94.

Actuation of relay 94 will shift contact 92 from a contact 103 to a contact 104 to extinguish a set of "power off" lights 105 and energize a set of "power on" lights 106.

A main capacitor bank charging circuit switch 110 is provided to actuate a relay 112 and initiate charging of capacitors 66. When closed, switch 110 completes a circuit which may be traced from the secondary winding of transformer 80 through conductor 90, contacts 92 and 104, a conductor 114, door interlock switches 115, 116, conductors 118 and 120, the solenoid 112a of relay 112, a conductor 122 and switch 110 to ground. Actuation of the relay 112 will establish a holding circuit therefor through contacts 124, 125 thereof which, when closed, by-passes the switch 110 to ground.

Actuation of relay 112 also energizes a relay 128 by a circuit which may be traced from conductor 120 through contacts 130, 131 of relay 112, a conductor 132, and solenoid 128a of relay 128 to ground. Actuation of relay 128 establishes a circuit for a transformer 134 which circuit may be traced from A.C. power terminal 74 through conductor 76, a circuit breaker 136, a conductor 137, contacts 138, 139 and 140, 141 of relay 128, conductors 142 and 143, the primary winding of transformer 134, and conductor 84 to the A.C. common terminal 86. Actuation of relay 128 also energizes a "banks charging" indicator light 146 and its associated dropping resistor 147 connected between conductors 142 and 84. Additionally it is desirable to include a voltmeter 148 to indicate input voltage to the transformer 134.

The secondary of transformer 134 is connected by conductors 150, 151 to a full wave, diode rectifier bridge network 152, the rectified, high voltage output of which is utilized to charge the bank of capacitors 66. To this end, the rectified network 152 is connected to one side of each of the capacitors 66 through resistors 154, 155 and a conductor 156. The other sides of the capacitors 66 are connected by a conductor 158, contacts 160, 161, 162, 163 of a relay 164, and a conductor 166 to the rectifier network 152 during charging. The solenoid 164a of relay 164 is energized by direct current obtained through conductors 168, 170 from a rectifier network 172. The latter is connected between conductor 120 and ground, and so is supplied with A.C. power from the step-down transformer 80 when relay 94 is actuated.

The capacitors 66 are connected on the one side by conductors 156, 174, a choke 176, and a conductor 178 to one end of the electrode 60 of the flashtube 32, and on the other side by conductors 158, 180 and 182 to ground and to the electrode 61 of the flashtube. Upon application of a high trigger voltage across the electrodes 60, 61 by the secondary winding of trigger transformer 64 to ionize gas between the electrodes, the charged capacitors 66 will discharge through the ionized gas to produce the desired flash of light.

The primary winding of the trigger transformer 64 is connected between ground and one side of a pair of parallel connected storage capacitors 184. These capacitors 184 are adapted to be charged from a charging circuit including a transformer 186 and a full wave rectifier network 188. The primary of transformer 186 is energized upon actuation of relay 94 through contacts 190, 191 thereof, the latter being connected via conductors 192 and 76 to the 115 volt A.C. terminal 74. The secondary winding of transformer 186 is connected across the rectifier network 188, the output of which is smoothed by filter means including a resistor 194 and capacitor 196 and applied through resistor 198 to the capacitors 184. A "trigger ready" indicator light 200 and its associated dropping resistor 201 are connected between ground and a voltage sampling network of resistors 202, 203, and 204.

The resistor 198 limits the rate of charge of the capacitors 184 so that current charge through the primary of transformer 64 will be insufficient to cause triggering of the flashtube by the charging process.

A flasher switch 210 is provided to effect flashing of the tube 32, as well as to effect flashing of the fireball simulating floodlights 36 as will later be explained. Thus, the switch 210 comprises a switch element 212 which, when closed, establishes a trigger circuit which may be traced from capacitors 184 through a conductor 206, switch element 212, and a conductor 208 to ground. The resulting rapid discharge of capacitors 184 produces a current pulse through the primary of trigger transformer 64, the voltage step-up character of which provides adequate voltage between the electrodes 60, 61 to initiate the discharge of capacitors 66.

The state of charge of capacitors 66 prior to flashing of the tube 32 is conveniently monitored by a "banks ready" indicator light 214 and its associated dropping resistor 216 connected between the arm of a potentiometer 218 being connected in a resistance network including resistors 220, 222 between codnuctor 124 and ground.

The potentiometer 218 may be adjusted so that the light 214 will glow when a predetermined state of charge, e.g., about 4000 volts is reached. The state of charge may also be monitored by means of a voltmeter 222 connected between ground and the arm of a potentiometer 224 forming part of a resistance network including resistors 226, 228 for deriving a monitoring potential from the capacitors 66.

A counter 230 is provided to maintain a tally of the number of times the flashtube 34 has been fired. Thus, a relay 232 is connected by a conductor 234 to be actuated with each energization of relay 128, and comprises contacts 236 which, when closed, connect the counter 230 between positive and negative 24 volt input terminals 238, 240 through conductors 242, 244, 246, switch element 248 of switch 210, conductors 250, 252, 254, 256 and 258.

The previously mentioned floodlamps 36 are used to simulate the effect of light from a fireball which follows a nuclear blast. When the xenon tube 32 is flashed, a bank of parellel connected stroage capacitors 260 are discharged through the floodlamps 36 so that, following the initial intense flash of the flashtube 32, the floodlamps are initially driven to full brightness. The brightness of the floodlamps 36 then decreases to zero over a period of approximately three seconds.

Charging of the capacitors 260 is accomplished by means of a full wave rectifier bridge 261 which is supplied with 115 volt A.C. current through conductors 262, 263 connected to power terminals 264, 265. The output of the rectifier bridge 261 is applied to one side of the capacitors 260 via conductors 266, 267, and to the other side of the capacitors via conductor 268, resistors 270, conductor 272, contacts 274, 275 of a a relay 276, and conductors 278 and 280.

The floodlamps 36 are connected across the bank of capacitors 260 on one side by conductors 282, and on the othed side by a conductor 284 and a silicon controlled rectifier 286 and conductor 280. The silicon controlled rectifier 286, hereinafter referred to simply as SCR 286, serves as a switching element to prevent the discharge of the capacitors through the lamps 36 until such time as the flasher switch 210 is pushed by the instructor.

Trigger voltage and negative bias voltage to the cathode of SCR 286 are supplied through the relay 276 when the switch 210 is actuated. Thus, closing of switch element 290 of switch 210 establishes an actuating circuit for relay 276 and for a relay 292, which circuit may be traced from the 24 volt positive D.C. terminal 238 through conductors 242, 244 and 246, a switch 293, switch element 290, conductors 294 and 296, the solenoids 276a and 292a of the respective relays, and conductors 256 and 258 to the negative 24 volt D.C. terminal 240.

Actuation of relay 276 supplies a trigger voltage to the control electrode 286a of SCR 286 via conductor 298, contacts 300, 301 and conductor 302, the potential being derived from a resistor network including resistor 304 and variable resistor 306 connected across the D.C. voltage supply. Application of the trigger voltage renders SCR 286 conductive so that the capacitors 260 may discharge through the floodlamps 36 to create the desired fireball effect.

Relay 292 is a time delay relay having contacts 310, 311 which open approximately 20 seconds after initial energization of the relay circuit by operation of switch 210. The contacts 310, 311 form part of a holding circuit for relay 276, which holding circuit is established upon closing of contacts 312, 313 of relay 276. Thus, about 20 seconds after discharge of the capacitors 260 through lamps 36 has been initiated, relay 292 opens the holding circuit for relay 276 which in turn opens and terminates the application of trigger voltage and negative bias to SCR 286, whereupon the charging of capacitors 260 is automatically begun for a subsequent fireball simulation.

A switch 314 and associated conductors 315, 316, and 317 are provided to permit manual operation of the fireball circuit, this switch providing the same functions as relay 276.

Switch 293 is provided to permit operation of the flashtube 32 without the accompanying fireball effect in the event the switch 293 is left open.

The trainer provides means for subjecting the trainee T to several visual perception tasks one of which includes use of the artificial horizon instrument simulator 16 and the control stick 15. Briefly, and as will be more fully described hereinafter, the instructor at his console selects the task by positioning a switch 316 to the illustrated "pitch" position. He then positions an "updown" switch 318 to either the "up" or the "down" position which positions have reference to the nose up or nose down pitch attitude which will be represented at the artificial horizon instrument simulator 16 upon pushing of the flasher switch 210.

The artificial horizon instrument simulator 16 comprises a horizon reference line 320 (FIG. 2) and a movable aircraft indicator 322. The selection made by the instructor at switch 318 will determine whether the indicator 322 will be deflected above the line 320 to indicate a nose up pitch condition, or will be deflected below the line to indicate a nose down pitch condition.

After being flash blinded by the flash of tube 32 lamps 36, the trainee attempts to cancel deflection of the indicator 322 by manipulation of the control stick 15. Automatic timing means, including a clock 324 on the instructor's console, registers the time required after the flash for the trainee to recover sufficient vision to obtain and retain cancellation of the deflection for a period of about four seconds.

Positioning of the task selection switch 316 to the "pitch" position and pushing the flasher switch 210 actuates a relay 328 by a circuit which may be traced from D.C. terminal 238 through conductors 242, 244, 246, switch element 248, conductor 250, switch 316, a conductor 330, solenoid 328a, and conductor 332 to terminal 240. Relay 328 is held actuated by a holding circuit including a switch 352, conductor 354, contacts 356, 357 of a relay 358, conductor 359, contacts 360, 361 of relay 328, and a conductor 362.

The clock 324 which forms part of the timing means, comprises a typical synchronous A.C. motor and a reset solenoid 324a. The latter is connected between 115 volt A.C. power terminals 366, 368 by a conductor 370, a switch element 372 of which 210, and conductors 374 and 376. Thus the clock is reset upon each closing of switch 210.

The clock 324 is connected on one side to A.C. terminal 366, and on the other side through a conductor 378, a rectifier diode 380, and conductor 376 to the A.C. terminal 368. Normally, the diode 380 acts as a brake on the clock preventing it from running. When, however, the flasher switch 210 is pushed and relay 328 is actuated, a circuit is established through a conductor 382, contacts 384, 385 of relay 328, and conductors 386, 388 and 376 to by-pass the diode 380 and thereby start the clock running with the initiation of the flash of tube 32.

Actuation of the relay 328 also energizes circuitry for positioning the articifical horizon indicator 322 either "up" or down in accordance with the instructor's selection at switch 318. Thus, an integrating amplifier 390 and its associated capacitor 392 are connected by a network of resistors 394, 396, 398 to drive the artificial horizon simulator 16 and a pitch meter 400 which is mounted on the instructor's console 50, the simulator and meter being connected by a conductor 402 to the mid-junction of a network of resistors 404, 406, 408, 410 connected between positive and negative 15 volt D.C. power terminals 412 and 414.

An initial deflection input to the integrator amplifier 390 is derived from one end or the other of a potentiometer 416 via conductor 418 or 420, selector switch 318, a conductor 422, contacts 423, 424 of relay 328, conductor 426 and resitsor 428. Accordingly, when the flasher switch 210 is operated and relay 328 actuated, the indicator 322 jumps to the selected up or down deflected position selected by switch 318.

It is then the task of the trainee to utilize the control stick 15 to cancel the deflection. For this purpose the control stick 15 is mechanically coupled to the arm 416a potentiometer 416 which is connected by conductor 430 to the input of the integrator amplifier 390 and serves to change the deflection of indicator 322 as the control stick is moved back and forth.

When cancellation has been obtained and held for about four or five seconds, the clock 324 is automatically stopped. This is accomplished through the agency of amplifiers 434, 436 and 438 which serve to de-energize relay 358 when the output amplifier 390 has been nulled by the trainee for a continuous period of say five seconds.

Amplifier 434 and its by-pass loop including resistor 440 and diode 442 insure that the input to amplifier 436 is always positive. As long as the output of amplifier 390 is other than zero, the output of amplifier 436 will be a negative voltage. The output of amplifier 463 is summed with a positive bias voltage at the input to amplifier 438, this bias voltage being obtained from resistors 444 and 446. The system gain is such that for any value output of amplifier 390, the output of amplifier 438 is positive. This positive output of amplifier 438 on conductor 448 is prevented by a diode 450 from reaching solenoid 358a of relay 358 via conductod 452, the solenoid being connected by conductor 453 to the mid-point of resistor network 404, 406, 408, 410.

When, however, the output of amplifier 390 becomes zero, the amplifier 438 output is negative and the positive input bias voltage is integrated by that amplifier in cooperation with feedback capacitor 454 at a fixed rate such that the integrated output of amplifier 538 is great enough to energize relay 358 after the mentioned five seconds. It should be noted that, due to the presence of a diode 456, the feedback capacitor 454 will charge up only when output of amplifier 438 is negative. That is, when the trainee has nulled the input to the amplifier 390.

Enegrization of the relay 358 breaks the previously described holding circuit for relay 328, which in turn breaks the circuit bypassing the diode 380, thereby stopping the clock 324. The instructor can read directly from the clock 324 the time required after the flash for the trainee to recover sufficient vision to accomplish the pitch tracking task. De-energizing of relay 328 also closes contacts 460, 461 thereof which shorts out amplifier 438 and capacitor 454 via conductor 462, returning the system to a ready condition.

An alternative task, namely that of reading the simulated altimeter 17, may be selected by shifting the selector switch 316 to the dotted line position. The simulated altimeter 17 comprises a conventional servo receiver on the shaft of which an indicator 17a is carried. The altimeter 17 is connected in conventional fashion to a servo-transmitter 470 mounted on the instructor's console 50 and having a shaft mounted indicator 470a by which the instructor can select an altitude to be indicated by the altimeter 17. The altimeter 17 and transmitter 470 have stator windings 472 and 474 which are adapted to be energized with A.C. power from a transformer 476, the primary of which is connected to A.C. power terminals 478, 480. The secondary of transformer 476 is connected on one side by conductor 482 to the stator windings 472, 474, and on the other side to a contact 484 of relay 486. Contact 484 is engageable by contact 488 upon actuation of relay 486 to complete energization of the windings 472, 474 through a conductor 490.

Actuation of relay 486 is effected via switch 316 and a conductor 491 to the solenoid 486a upon pushing of flasher switch 210 and, accordingly with an altitude setting pre-selected by the instructor, the altimeter indicator 17a will jump to the selected setting at the time of the flash. Actuation of relay 486 establishes a holding circuit therefor through contacts 492, 493 thereof, and also starts the clock 324 running. The latter is accomplished by virtue of contacts 496, 497 of relay 486 which are connected by conductors 388 and 498 in parallel with the clock starting contacts 384, 385 of relay 328.

When the trainee recovers sufficiently from his flash blindness to correctly call out the reading of the altimeter 17, the instructor opens switch 352, thereby breaking the holding circuit for relay 486 and stopping the clock 324.

In order to demonstrate the value of using cockpit stormlights 54 as an aid to, in effect, "see through" the blindness so that the instruments can be read, the invention includes circuitry for permitting the trainee to manually increase the brightness of the lights 54, or for causing the lights to brighten automatically when the flash is initiated. This circuitry comprises a stormlight function selector switch 500 having five switch positions each of switch elements A1, A2; B1, B2; and C1, which elements are mechanically gang operated.

The five functions which may be selected by switch 500 correspond to the five contacts enumerated for each element and are:

(1) off—(no lights)
(2) low—(lights remain at low level when tube 32 is flashed)
(3) auto-hi—(lights increase automatically from low to high brightness when unit is flashed and remain bright until circuit is reset)
(4) reset—(breaks holding loop for a relay 502)
(5) pilot—(allows pilot trainee to adjust brightness manually using control knob 52 for a potentiometer 504).

The switch 500 is illustrated in the auto-hi position wherein the stormlights 54 are energized at low level by a circuit which may be traced from D.C. terminal 238 through conductors 242, 244, 506, 508, switch element A1, arm 510a of a potentiometer 510, switch element A2, conductor 512, contacts 514, 515 of relay 502, a conductor 516, lights 54, and conductors 254, 256 and 258 to D.C. terminal 240. The setting of potentiometer arm 510 determines the initially low brightness level of the lights 54.

Pushing of flasher switch 210 establishes a circuit which may be traced from D.C. terminal 238 through conductors 242, 244, 246, switch element 248, conductors 250, 517, capacitor 518, switch element B2, conductor 520, solenoid 502a of relay 502, and conductors 522, and 258 to D.C. terminal 240. Thus, when flasher switch 210 is pushed, relay 502 is actuated and contact 515 disengages contact 514 and engages a contact 524, thereby substituting conductors 526, 528, switch element B1, and conductor 506 for the potentiometer 504 which brings the lamps 54 to full brightness.

Actuation of relay 502 also establishes a holding circuit through contacts 530, 531 thereof, which circuit maintains energization of the relay 502 until the circuit is reset by turning switch 500 to the fourth position.

In the fifth position, switch 500 places control of the brightness in the trainee by a circuit which includes potentiometer 504, the arm 504a of which is then connected by a conductor 534, switch element C1 and conductors 536 and 516 so as to permit varying of the effective resistance of potentiometer 504 by knob 52.

From the foregoing detailed description of a flash blindness indoctrination trainer embodying the present invention, it will be appreciated that the previously stated objects and advantages, as well as others apparent from the description, have been achieved thereby.

Of course many modifications and variations of the present invention are possible in the light of the above teachings. It is therefore to be understood that within the scope of the appended claims the invention may be practiced otherwise than as specifically described.

What is claimed is:

1. A flash blindness indoctrination trainer comprising:
   a translucent, light diffusing screen;
   means defining a trainee station on one side of said screen;
   flashtube and reflector means disposed on the other side of said screen for directing a flash of high intensity light therethrough toward said trainee station;
   floodlamp means disposed on said other side of said screen for directing progressively decaying light through said screen;
   power supply and control circuitry for energizing said flashtube and said floodlamp means including first circuit means to initiate the operation of said flashtube, and second circuit means responsive to the operation of said first circuit means to operate said floodlamp means to simulate a nuclear flash and subsequent fire ball effect sufficient to induce flash blindness in the eyes of a trainee at said station.

2. A flash blindness indoctrination trainer as defined in claim 1 and further comprising:
   instrument simulation means including movable indicator means at said trainee station; and
   an instructor's station including flasher switch means for firing said flashtube; and
   means at said instructor's station for selectively positioning said movable indicator means at said trainee station.

3. A flash blindness indoctrination trainer as defined in claim 2 and further comprising:
   clock means;
   said power supply and control circuitry comprising means for automatically starting said clock means upon operation of said flasher switch means.

4. A flash blindness indoctrination trainer as defined in claim 3 and wherein:
   said instrument simulation means comprises a simulated altimeter and said movable indicator indicates altitude; and
   said simulated altimeter and said means at said instructor's station for selectively positioning said indicator means comprising a servo-receiver and a servo-transmitter, respectively.

5. A flash blindness indoctrination trainer as defined in claim 4 wherein:
   said power supply and control circuitry comprising means for delaying response of said servo-receiver to positioning of said servo-transmitter until said flasher switch is actuated.

6. A flash blindness indoctrination trainer as defined in claim 3 and wherein:
   said instrument simulation means comprises a simulated artificial horizon device and said movable indicator means comprises a pitch indicator;
   pitch selector means at said instructor's station for selecting a predetermined "nose up" or "nose down" pitch condition to be indicated at said artificial horizon device.

7. A flash blindness indoctrination device as defined in claim 6 and wherein;
   said power supply and control circuitry comprising means for delaying response of said artificial horizon device to said pitch selector means until actuation of said flasher switch means.

8. A flash blindness indoctrination trainer as defined in claim 7 and further comprising:
   pitch control means at said trainee station;
   said power supply and control circuitry including means responsive to operation of said pitch control means by a trainee to modify the pitch indication of said artificial horizon device.

9. A flash blindness indoctrination trainer as defined in claim 8 and wherein:
   said power supply and control circuitry comprising means responsive to said pitch control means to stop said clock means when indication of said predetermined pitch condition has been cancelled for a predetermined time period by operation of said pitch control means.

10. A flash blindness indoctrination trainer as defined in claim 1 and further comprising:
    motion picture projector means mounted so as to project on said screen a scene simulating for a trainee at said trainee station a view of the ground as it would be seen through the windshield of an aircraft during a low level flight mission.

References Cited

UNITED STATES PATENTS

| | | | |
|---|---|---|---|
| 2,295,994 | 9/1942 | Howe et al. | 40—132 |
| 2,979,832 | 4/1961 | Klemperer | 35—12 |

EUGENE R. CAPOZIO, *Primary Examiner.*

PAUL V. WILLIAMS, *Assistant Examiner.*

U.S. Cl. X.R.

40—132; 240—2